FOCUSING FIELD CORRECTION APPARATUS

Filed June 26, 1958 2 Sheets-Sheet 1

INVENTOR.
Jacob Goldberg
BY
Rines and Rines
ATTORNEYS

Aug. 1, 1961 J. GOLDBERG 2,994,803

FOCUSING FIELD CORRECTION APPARATUS

Filed June 26, 1958 2 Sheets-Sheet 2

INVENTOR.
Jacob Goldberg
BY Rines and Rines
ATTORNEYS

United States Patent Office 2,994,803

Patented Aug. 1, 1961

2,994,803

FOCUSING FIELD CORRECTION APPARATUS

Jacob Goldberg, Burlington, Mass., assignor to Edgerton, Germeshausen and Grier, Inc., Boston, Mass., a corporation of Massachusetts Filed June 26, 1958, Ser. No. 744,766
15 Claims. (Cl. 315—27)

The present invention relates to focusing-field correction apparatus and, more particularly, to apparatus adapted for use with electron-stream generating and deflection systems.

It is quite customary, in cathode-ray devices and the like, to employ focusing fields that converge an electron stream to a point focus at a screen, such as, for example, a fluorescent viewing screen or a television-type vidicon screen and the like. The electron stream is usually also subjected to deflection fields that direct the focused stream to desired positions upon the screen. Among the types of focusing field producing means that have heretofore been widely used are electrostatic and electromagnetic lens devices. The former are perhaps more widely employed and generally embody a winding disposed externally to the cathode-ray envelope. It is, however, quite difficult to produce a focusing field that is free of aberrations, so that there is invariably some distortion or asymmetry in focusing the electron beam as a sharp point image at the screen. Among the aberrations resulting from distortion or asymmetry in the focusing lens system or asymmetry within the cathode-ray device, both hereinafter referred to as "focusing-field asymmetry," are aberrations somewhat analogous to astigmatism in the optical sense, where the intended point-focus becomes a line focus. The convergence of the electron beam may be non-uniform for different axes so that different lens settings are required to produce a sharp focus along, for example, both horizontal and vertical axes, as is necessary to produce a round, sharp, point focus. In some applications, this distortion is unobjectionable. In other uses, however, the distortion must be corrected, or at least partially corrected. Various proposals have therefore been made for trying to effect such corrections, including the use of magnet slugs and the like appropriately positioned within the focusing coil to introduce a correction field for producing a compromise focus for both horizontal and vertical axes. Unfortunately, however, it is difficult to adjust such correcting devices, the adjustment requiring that the operator remove the cover of the instrument containing the cathode-ray device in order to manipulate the slugs in the focusing coil. The high voltage normally used on cathode-ray devices also renders this procedure somewhat dangerous. There is, moreover, only a limited range of correction that can be effective with devices of this character.

An object of the present invention, accordingly, is to provide a new and improved correction apparatus that shall not be subject to these disadvantages, but to the contrary, shall provide for easy, safe and reliable adjustments external to the cathode-ray apparatus and its cover, if desired, and, that provides for a wide range of correction fields.

A further object is to provide a focusing-correction device of more general utility, as well.

Other and further objects will be explained hereinafter and will be more particularly pointed out in the appended claims.

In summary, the present invention embodies the concept of producing a pair of orthogonally oriented supplemental fields positioned near the focusing field and providing means for adjusting the relative magnitudes of the orthogonal supplemental fields to produce a resultant distortion-modifying field oriented along a direction or axis appropriate to compensate for the focusing asymmetry or aberration.

The invention will now be described in connection with the accompanying drawing, FIG. 1 of which is a schematic circuit diagram illustrating a preferred apparatus constructed in accordance with the present invention;

Figure 2:
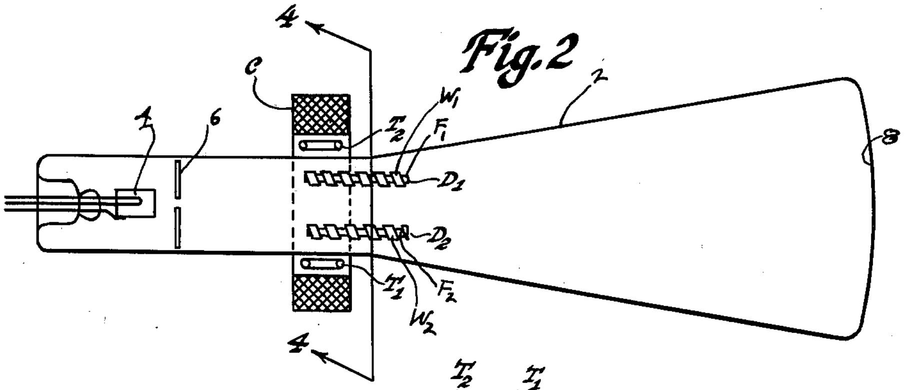
FIG. 2 is a side elevation, partially sectionalized, showing the physical arrangement of the parts of FIG. 1.

Referring to FIG. 2, a cathode-ray apparatus 2 of any desired type, such as a cathode-ray viewing tube or a television pick-up tube and the like, is shown provided with a conventional electron-gun assembly, schematically illustrated as the block 4, one or more accelerating apertured anodes 6, and a screen 8, as is well known and as is described, for example, in copending application, Serial No. 591,339, filed June 14, 1956, by Kenneth J. Germeshausen, Seymour Goldberg, and Daniel F. McDonald, for "Cathode-Ray Apparatus and Method." A conventional focusing-field coil lens C is shown disposed about the neck of the envelope 2 to focus the electron stream generated by the electron gun 4 and accelerated by the anode or anodes 6 to the screen 8. The electron stream, as is well known, may be brought to a cross-over point, not shown, prior to the apertured member 6, and may be considered a point source that is to be imaged by the lens C upon the screen 8. Electron-stream deflection apparatus $D_1$ and $D_2$ may be employed for positioning the focused electron stream at desired regions of the screen 8, as is also well known. The deflection apparatus may assume the form of electrostatic or electromagnetic devices or it may embody the preferred form of helical traveling-wave windings $W_1$ and $W_2$. As explained in the said copending application, this type of preferred deflection apparatus $D_1$ and $D_2$ is adjusted so that the deflection-signal transit time along the deflection windings $W_1$ and $W_2$ and the electron-stream transit time through the space between the windings are substantially equated. As is more particularly explained in a further copending application, Serial No. 690,950, filed October 18, 1957, by the said Kenneth J. Germeshausen and Seymour Goldberg, for Electron-Beam Deflection Apparatus, the windings $W_1$ and $W_2$ are preferably substantially flat-oval ribboned windings disposed about respective substantially flat ground plates $F_1$, $F_2$, though maintained out of electrical contact therewith, and, preferably, with no impedance discontinuity such as dielectric material and the like disposed between the windings $W_1$ and $W_2$ and the respective internal ground-plate forms $F_1$ and $F_2$. The deflection field produced by the deflection apparatus $D_1$, $D_2$, moreover, as is further explained in the said copending applications, preferably at least partially overlaps the focusing field produced by the focusing coil C in order to obtain improved sensibility in the operation of the cathode-ray device. This preferred construction is illustrated in FIG. 2 by the partial overlapping of the deflection apparatus $D_1$–$D_2$ and the focusing coil C. Other types of deflection apparatus, of course, may also be employed, if desired.

Figure 1:
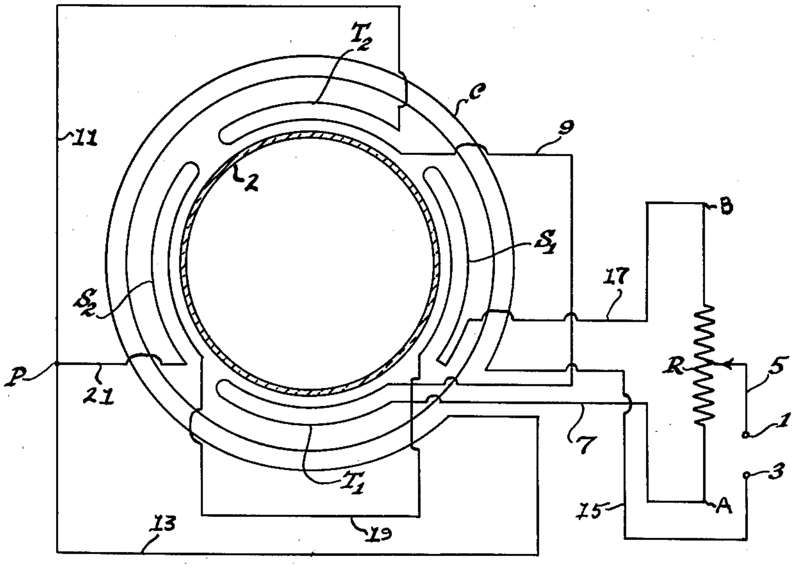

As below explained, if the focusing field produced by the coil C is not perfectly symmetrical, or there are asymmetries in the tube 2, the electron-stream point source at the cross-over point of the electron gun 4 will not be focused sharply as a circular point on the screen 8, but it will be focused as a line, the axis or direction of which depends upon the asymmetry. The line may, in turn, even be degenerated into a two-dimensional solid figure of considerable size if the asymmetry is particularly serious. In accordance with the present invention, as shown in FIG. 1, there are provided two pairs of supplemental-field producing loops or saddle-type coils $T_1$–$T_2$ and $S_1$–$S_2$. The loops $T_1$ and $T_2$ are shown straddling the upper and lower portions of the electron tube 2 and the loops $S_1$ and $S_2$ are shown orthogonally positioned with respect to the loops $T_1$ and $T_2$ and straddling the side walls of the envelope 2. The loops $T_1$ and $T_2$, when fed with current, will produce a field that is therefore orthogonal to the field that will be produced by the loops $S_1$ and $S_2$. It is the supplemental resultant field produced by the currents in the two pairs of orthogonal coils $T_1$–$T_2$ and $S_1$–$S_2$, that, in accordance with the present invention, is adjusted to compensate for or correct any distortion or asymmetry produced by the focusing coil C or other field-distorting causes. Depending upon the relative magnitudes of the currents fed in the loops $T_1$–$T_2$ and $S_1$–$S_2$, this resultant compensating or correcting field will have any desired resultant axis, direction or orientation.

Figure 3:
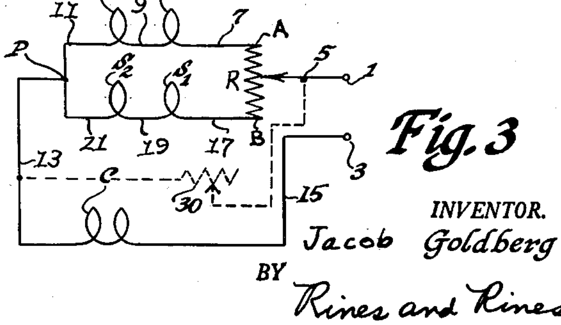
FIG. 3 is a schematic simplified circuit diagram of a preferred circuit for the systems of FIGS. 1 and 2.

A preferred circuit for adjusting the relative magnitudes of the currents energizing the orthogonally oriented supplemental field-producing loops $T_1$–$T_2$ and $S_1$–$S_2$ is shown in FIG. 1 and is more readily illustrated in the simplified diagram of FIG. 3. A source of current from terminals 1, 3, is appiled from the upper terminal 1 along a conductor 5 to a point along a voltage-dividing resistor or other impedance element R. The circuit then divides into two branches; one, from the A terminal of R along conductor 7 to and through the loop $T_1$, then along conductor 9 to and through the loop $T_2$, and along conductor 11, to a point P; and the other, from the B terminal of resistor R along conductor 17 to and through loop $S_1$, along conductor 19 to and through loop $S_2$, and along conductor 21 to the same point P. From the point P, the current supply circuit continues by conductor 13 preferably to and through the focusing coil C, and by conductor 15 to the current-supply circuit input terminal 3. The loops $T_1$ and $T_2$ are thus series-connected in the upper branch 7, $T_1$, 9, $T_2$, 11, and the loops $S_1$ and $S_2$ are series-connected in the lower branch 17, $S_1$, 19, $S_2$, 21, FIG. 3. The focusing coil C, moreover, is preferably connected as shown in series circuit with the upper and lower parallel branches, above-described. Adjustment of the slider 5 up and down the resistor R, will not appreciably affect the current flowing through the focusing coil C but it will, however, vary the relative magnitudes of the currents supplied to the pair of loops $T_1$, $T_2$ and the pair of loops $S_1$, $S_2$, thus to effect the before-mentioned desired adjustment of the relative magnitudes of the orthogonal supplemental fields produced by these pairs of loops. A simple and facile adjustment of the direction and magnitude of the resultant compensating supplemental field is thus easily externally effected in accordance with the present invention and any desired distortion in the converging of the electron beam to the required point focus may be corrected.

It is important, in accordance with the present invention, that the coils or loops $T_1$–$T_2$, $S_1$–$S_2$ be wound in such a manner that the radial flux produced by each coil be directed similarly to that produced by its complementary coil with respect to the path of the electron beam; that is, the flux of both coils of each pair of coils must be directed toward the center of the tube 2 or away from it. If the flux from one loop were directed toward the center while the flux of the other loop were directed away from the center, the two coils would act as a push-pull deflection system rather than as a correction of aberration. On the other hand, it is not essential that the flux from both pairs of coils act in the same direction, but maximum sensitivity is obtained when the flux from both pairs is directed in the same direction.

Figure 4:
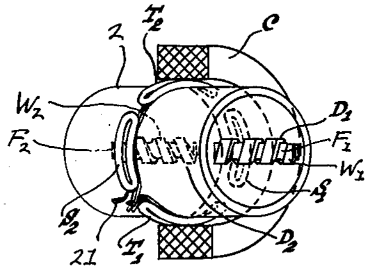
FIG. 4 is a fragmentary perspective taken along the lines 4—4 of FIG. 2 looking in the direction of the arrows.

As is more particularly evident from FIGS. 2 and 4, it is preferred in many cases to dispose the supplemental correcting-field producing loops $T_1$–$T_2$ and $S_1$–$S_2$, so that they at least partially overlap the focusing coil C and, in any event, near that focusing field which it is desired to correct. In FIGS. 2 and 4, the loops are shown, indeed, disposed within or under the coil C, and they may be covered with insulation, straddling the neck of the tube 2, as before mentioned. If desired, the supplemental correcting field may be positioned to the left or to the right of the particular position shown in the drawing, so as to be between the focusing field generated by the lens C and the accelerating anode 6, or further toward the screen 8; though, in all cases, it is preferably near the field produced by the focusing field coil C.

The present invention need not be practiced with the aid of only single loops $T_1$–$T_2$, $S_1$–$S_2$, but may, if desired, embody more than one loop. Ssimilarly, modifications in, or other types of current-supplying circuits may also be employed, if desired. As an example, independent variation of the focusing-coil current may be attained with the potentiometer 30, shown dotted in FIG. 3.

Figure 5:
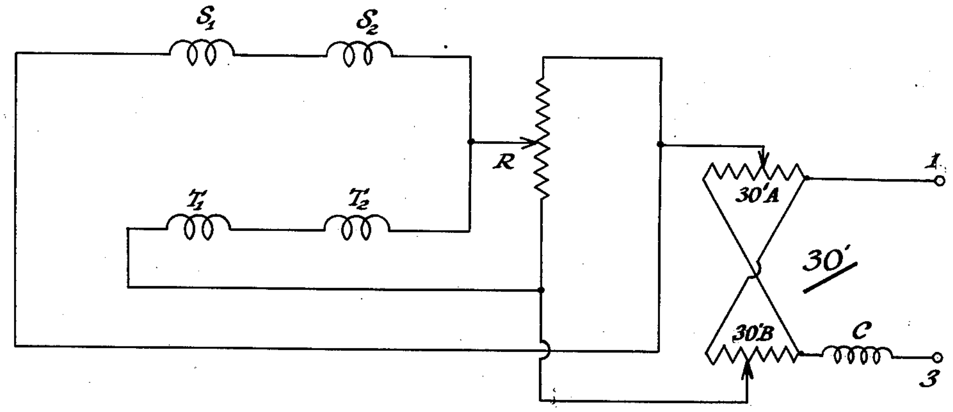
FIG. 5 is a circuit diagram of a modified electrical circuit.

A further modified circuit, as another illustration, is presented in FIG. 5, wherein a dual potentiometer 30′ is employed, embodying a pair of cross-connected potentiometer windings 30′A and 30′B. The potentiometer R, as in the embodiments of FIGS. 1 and 3, will control the direction of the correction by controlling the ratio of the currents in branches $T_1$–$T_2$ and $S_1$–$S_2$; i.e. the net cylindrical lens effect produced by the four fields of the two pairs of loops may be rotated to correct aberrations along any axis perpendicular to the electron beam. The potentiometer 30′, on the other hand, will control the magnitude of the correction.

Further modifications may also occur to those skilled in the art, and all such are considered to fall within the spirit and scope of the invention, as defined in the appended claims.

What is claimed is:

1. In a system in which a focusing field operates upon an electron stream and the like, apparatus for compensating for asymmetry in the focusing action of the field that comprises, means for producing a pair of orthogonally oriented supplemental fields positioned near the focusing field, each of the fields producing flux directed in opposite directions to each other and in similar directions with respect to the electron stream, and means for adjusting the relative magnitudes of the orthogonal supplemental fields to produce a resultant distortion-modifying field oriented along a direction appropriate to compensate for the focusing-field asymmetry.

2. In a system in which a focusing field operates upon an electron stream and the like, apparatus for modifying the focusing action of the field that comprises, means for producing a pair of orthogonally oriented supplemental fields positioned near the focusing field, each of the fields producing flux directed in opposite directions to each other and in similar directions with respect to the electron stream, and means for adjusting the relative magnitudes of the orthogonal supplemental fields to produce a resultant supplemental field for modifying the focusing action of the focusing field.

3. In a system in which a focusing field operates upon an electron stream and the like, apparatus for compensating for asymmetry in the focusing action of the field that comprises, pairs of orthogonally oriented current-carrying loops for producing pairs of orthogonally oriented supplemental fields and positioned near the focusing field, both loops of each pair being wound such that the flux produced by the fields thereof are similarly directed with respect to the electron stream in order to produce substantially zero net deflection field, and means for adjusting the relative magnitudes of the currents fed to the loops correspondingly to adjust the relative magnitude of the orthogonal supplemental fields produced thereby, in order to produce a resultant distortion-modifying field oriented along a direction appropriate to compensate for the focusing-field asymmetry.

4. In a system in which a focusing field operates upon an electron stream and the like, apparatus for compensating for asymmetry in the focusing action of the field that comprises, pairs of orthogonally oriented current-carrying loops for producing pairs of orthogonally oriented supplemental fields and positioned near the focusing field, a current-supply circuit having two branches, each for receiving one of the orthogonal loops, both loops of each pair being wound such that the flux produced by the fields thereof are similarly directed with respect to the electron stream in order to produce substantially zero net deflection field, and means for adjusting the relative magnitudes of the currents supplied to the branches correspondingly to adjust the relative magnitudes of the orthogonal supplemental fields in order to produce a resultant distortion-modifying field oriented along a direction appropriate to compensate for the focusing-field asymmetry.

5. In a system in which a focusing field operates upon an electron stream and the like, apparatus for modifying the focusing action of the field that comprises, pairs of orthogonally oriented current-carrying loops for producing pairs of orthogonally oriented supplemental fields and positioned near the focusing field, a current-supply circuit having two branches, each for receiving one of the orthogonal loops, both loops of each pair being wound such that the flux produced by the fields thereof are similarly directed with respect to the electron stream in order to produce substantially zero net deflection field, and means for adjusting the relative magnitudes of the currents supplied to the branches correspondingly to adjust the relative magnitudes of the orthogonal supplemental fields in order to produce a resultant supplemental field for modifying the focusing action of the focusing field.

6. In a system in which a focusing field operates upon an electron stream and the like, apparatus for compensating for asymmetry in the focusing action of the field that comprises, two pairs of orthogonally oriented current-carrying loops for producing two pairs of orthogonally oriented supplemental fields, the loops of each pair being disposed on opposite sides of the electron stream and positioned near the focusing field, a current-supply circuit having two branches, each for receiving the loops of one of the pair of orthogonal loops in series-circuit connection, both loops of each pair being wound such that the flux produced by the fields thereof are similarly directed with respect to the electron stream in order to produce substantially zero net deflection field, and means for adjusting the relative magnitudes of the currents supplied to the branches correspondingly to adjust the relative magnitudes of the orthogonal supplemental fields in order to produce a resultant distortion-modifying field oriented along a direction appropriate to compensate for the focusing-field asymmetry.

7. In a system in which a focusing-field producing means operates upon an electron stream and the like, apparatus for compensating for asymmetry in the focusing action of the field that comprises, two pairs of orthogonally oriented current-carrying loops for producing two pairs of orthogonally oriented supplemental fields, the loops of each pair being disposed on opposite sides of the electron stream and positioned near the focusing field, a current-supply circuit having two branches, each for receiving the loops of one of the pair of orthogonal loops in series-circuit connection, both loops of each pair being wound such that the flux produced by the fields thereof are similarly directed with respect to the electron stream in order to produce substantially zero net deflection field, means for connecting the focusing-field producing means in circuit with the said two branches, and means for adjusting the relative magnitudes of the currents supplied to the branches without altering the current fed to the focusing-field producing means, correspondingly to adjust the relative magnitude of the orthogonal supplemental fields in order to produce a resultant distortion-modifying field oriented along a direction appropriate to compensate for the focusing-field asymmetry.

8. Apparatus as claimed in claim 7 and in which the focusing-field producing means and the supplemental-field producing loops at least partially overlap.

9. Apparatus as claimed in claim 1 and in which electron-stream deflection means is provided extending beyond the supplemental-field producing means.

10. Apparatus as claimed in claim 9 and in which the deflection means and the focusing field at least partially overlap.

11. Apparatus as claimed in claim 7 and in which electron-stream deflection means is provided extending beyond the pairs of loops.

12. Apparatus as claimed in claim 11 and in which the deflection means and the focusing-field producing means at least partially overlap.

13. Apparatus as claimed in claim 6 and in which all the loops are wound so that the flux produced thereby is directed in the same direction with respect to the path of the electron stream.

14. Apparatus as claimed in claim 13 and in which the said direction is toward the electron stream.

15. Apparatus as claimed in claim 6 and in which the loops of at least one pair of loops are wound so that the flux produced thereby is directed in the same direction away from the path of the electron stream.

References Cited in the file of this patent

UNITED STATES PATENTS

| | | |
|---|---|---|
| 2,719,249 | Friend | Sept. 27, 1955 |
| 2,855,530 | Hamann | Oct. 7, 1958 |

FOREIGN PATENTS

| | | |
|---|---|---|
| 631,881 | Great Britain | Nov. 11, 1949 |
| 155,923 | Australia | Mar. 31, 1954 |